Feb. 28, 1933.　　　C. VENTIMIGLIA　　　1,899,370
TILE
Filed April 11, 1929

INVENTOR.
Carlo Ventimiglia
BY
ATTORNEY.

Patented Feb. 28, 1933

1,899,370

UNITED STATES PATENT OFFICE

CARLO VENTIMIGLIA, OF DETROIT, MICHIGAN

TILE

Application filed April 11, 1929. Serial No. 354,208.

My invention relates to a new and useful improvement in a tile and the method of making the same and has for its object the provision of a tile which may be made from plastic hardening material such as concrete or cement and constructed to simulate tiles of various designs and patterns.

It is another object of the invention to provide a tile which will be durable in use and economical to manufacture.

It is another object of the invention to provide a method of manufacturing whereby the tile may be formed from plastic material by unskilled labor and provided on its wearing face with designs of various kinds.

Other objects will appear hereinafter.

The invention consists in the combination and arrangement of parts hereinafter described and claimed.

The invention will be best understood by reference to the accompanying drawing which forms a part of this specification and in which, Fig. 1 is a top plan view of the form used in the invention.

Figure 1:
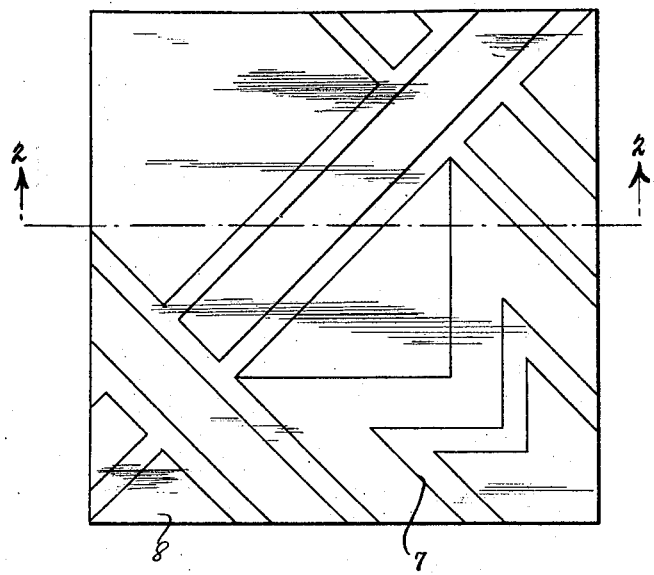
Figure 3:
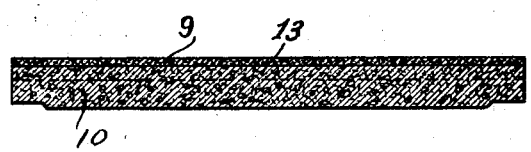
Fig. 3 is a sectional view taken through one of the finished tiles.
Figure 2:
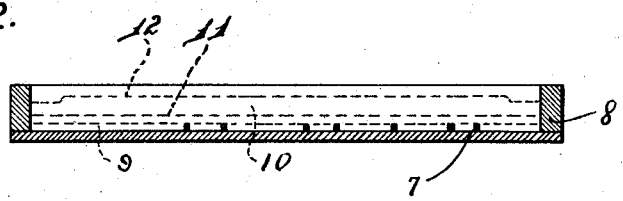
Fig. 2 is a sectional view taken on line 2—2 of Fig. 1.

In carrying out the invention, I provide a plurality of forms 7 which are positioned within a receptacle or form 8, this form 8 being of the size and shape of the tile that it is desired to manufacture. The forms 7 are positioned in the form 8 and where it is desired to form the wearing face of the tile with different colors, different colored cements will be poured into the different forms 7. The cement which is poured in the forms 7 is of such a mixture of sand and cement as, when finished, to provide a smooth surface. It will be noted that the forms 7 are not of the depth of the tile which it is desired to form and the face forming cement or mixture of cement and sand 9 is poured into the form 8 so as to fill the forms 7. After partial setting, the forms 7 are then removed and a mixture of cement and sand 13 which is coarser than the first mixture is poured into the form 8 until the level of the line 11 is reached. The form 8 is then filled with a still coarser mixture of cement and sand 10 until the line 12 is reached. In order to close the interstices or crevices in the face of the tile after partial setting, the tile is subjected to pressure.

By forming the tile in this manner, a smooth wearing face is provided and a coarser mixture of cement at the back of the tile is firmly amalgamated with the fine mixture, this resulting primarily by interposing between the extremely coarse mixture and extremely fine mixture a moderately coarse mixture.

I have found from experience that the tile constructed in this manner may be handled by unskilled laborers and little loss is due to breakage.

While I have illustrated and described the preferred form of my invention, I do not wish to limit myself to the precise details of structure shown but desire to avail myself of such variations and modifications as come within the scope of the appended claim.

Having thus described my invention what I claim as new and desire to secure by Letters Patent is:

A pressed tile comprising, a face layer formed from a fine mixture of sand and cement, a body portion formed from a coarse mixture of sand and cement to impart the requisite strength to the tile, and an intermediate layer consisting of a moderately coarse mixture of sand and cement interposed between said face layer and body portion, said intermediate layer acting as buffer to protect said fine face layer from injury by said coarse portion during formation of said tile.

In testimony whereof I have signed the foregoing specification.

CARLO VENTIMIGLIA.